(12) United States Patent
Babu et al.

(10) Patent No.: US 9,122,991 B2
(45) Date of Patent: Sep. 1, 2015

(54) SYSTEMS AND METHODS FOR PREDICTION OF TRIPS

(75) Inventors: Ravi Yoganatha Babu, Bangalore (IN); Vinay Bhaskar Jammu, Bangalore (IN); Achalesh Kumar Pandey, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 471 days.

(21) Appl. No.: 13/600,387

(22) Filed: Aug. 31, 2012

(65) Prior Publication Data
US 2014/0244567 A1 Aug. 28, 2014

Related U.S. Application Data

(63) Continuation-in-part of application No. 11/843,939, filed on Aug. 21, 2007, now Pat. No. 7,734,443, and a continuation-in-part of application No. 11/843,951, filed on Aug. 23, 2007, now Pat. No. 8,250,017.

(51) Int. Cl.
*G06N 5/04* (2006.01)
*F01D 21/00* (2006.01)
*G05B 23/02* (2006.01)
*F02C 9/00* (2006.01)

(52) U.S. Cl.
CPC *G06N 5/04* (2013.01); *F01D 21/00* (2013.01); *F02C 9/00* (2013.01); *G05B 23/0283* (2013.01); *F05D 2260/80* (2013.01); *F05D 2270/44* (2013.01)

(58) Field of Classification Search
CPC ........ G06N 5/04; F02C 9/00; G05B 23/0283; F05D 2260/80; F05D 2270/44; F01D 21/00

USPC ..................................................... 706/12, 47
See application file for complete search history.

(56) References Cited

U.S. PATENT DOCUMENTS

| 4,203,471 A | 5/1980 | Egener et al. |
| 6,343,251 B1 | 1/2002 | Herron et al. |
| 2009/0055130 A1 | 2/2009 | Pandey et al. |

OTHER PUBLICATIONS

Escobet et al ("Fault Detection of a Gas Turbine Fuel Actuator Based on Qualitative Causal Models" 2001).*
Yuan et al ("Real Time Sensor Validation and Fusion for Distributed Autonomous Sensors" 2004).*

(Continued)

*Primary Examiner* — Lut Wong
(74) *Attorney, Agent, or Firm* — Ann M. Agosti

(57) ABSTRACT

A system is disclosed. The system includes a processing subsystem that receives component data signals corresponding to a plurality of parameters of a device, wherein the processing subsystem generates one or more sets of state category component data by allocating the component data signals into respective one or more sets of state category component data, determines a plurality of first dynamic thresholds and a plurality of second dynamic thresholds corresponding to at least one of the one or more sets of state category component data based upon a respective set of state category component data in the one or more sets of state category component data and a respective parameter in the plurality of parameters, and determines an impending trip of the device utilizing the plurality of first dynamic thresholds and the plurality of second dynamic thresholds.

18 Claims, 7 Drawing Sheets

(56) References Cited

OTHER PUBLICATIONS

Rama Yedavalli ("Robust Estimation and Fault Diagnostics for Aircraft Engines with Uncertain Model Data" Jul. 2007).*

Kai Goebel ("Architecture and design of a diagnostic information fusion system" 2001.*

Bulloch et al., "Assessment of a Premature Failure in a Gas Turbine Part", Engineering Failure Analysis, vol. 7, Issue 6, Dec. 1, 2000; pp. 411-426.

John R. Wagner, "An Advanced Diagnostic and Prognostic System for Gas Turbine Generator Sets with Experimental Validation", Clemson University, Oct. 19, 2005; 33 Pages.

* cited by examiner

US 9,122,991 B2

SYSTEMS AND METHODS FOR PREDICTION OF TRIPS

CROSS REFERENCE TO RELATED APPLICATIONS

This application is a continuation-in-part of U.S. patent application Ser. No. 11/843,939, having U.S. Pat. No. 7,734,443 entitled "System And Method For Prediction Of Gas Turbine Trips Due To Thermocouple Failures", filed on Aug. 23, 2007, which is herein incorporated by reference. This application is also a continuation-in-part of U.S. patent application Ser. No. 11/843,951, entitled "System And Method For Prediction Of Gas Turbine Trips Due To Gas Control Valve Failures", filed on Aug. 23, 2007, which is herein incorporated by reference.

BACKGROUND

The present disclosure generally relates to systems and methods for prediction of trips, and more particularly to prediction of trips in gas turbines.

Gas Turbines are typically the main power producing components for combined cycle/independent power plants. A mixture of air and fuel is burnt in a combustor to produce thermal energy/heat that is converted into mechanical energy in the several stages of the turbine. Typically, Fuel/Gas Control Valves (GCV) and Inlet Guide Vanes (IGV) are used to control the amount of fuel and air supplied to the combustor. Furthermore, the GCV and IGV are controlled by servo systems. The servo system, for example, may be an IGV electrohydraulic servo system. Typically, the position of the IGV is controlled by electrohydraulic actuators in the electro hydraulic servo system. Furthermore, generally the servo system may be controlled by a controller. The servo system or one or more components in the servo system may send feedback signals to the controller. The controller uses the feedback signals to correct errors or determine future position of the IGV. However, sometimes one or more of the components in the IGV system may fail or may have errors, and the components may therefore generate erroneous feedback signals. In general, there may be several types of failures in an IGV system, such as, a servo fault, a linear voltage differential transformers (LVDT) failure, a valve jamming, hydraulic oil leakage, hydraulic pressure fluctuation, filter choking, or the like. The controller may control the future position of the IGV based upon the erroneous feedback signals. The determination of the future IGV position based upon the erroneous feedback signals may result in an inappropriate future position of the IGV. The inappropriate position of the IGV may cause damage to the gas turbine.

A turbine controller may identify such imminent damage, and may initiate tripping of the gas turbine. A trip is a rapid uncontrolled shutdown of the gas turbine that is initiated by the turbine controller to prevent damage. Such unwarranted trips may cause revenue loss and also reduce life of turbine components. Hence, there is a need for predicting an impending trip reliably and preventing loss of useful life of a gas turbine.

BRIEF DESCRIPTION

A system is disclosed. The system includes a processing subsystem that receives component data signals corresponding to a plurality of parameters of a device, wherein the processing subsystem generates one or more sets of state category component data by allocating the component data signals into respective one or more sets of state category component data, determines a plurality of first dynamic thresholds and a plurality of second dynamic thresholds corresponding to at least one of the one or more sets of state category component data based upon a respective set of state category component data in the one or more sets of state category component data and a respective parameter in the plurality of parameters, and determines an impending trip of the device utilizing the plurality of first dynamic thresholds and the plurality of second dynamic thresholds.

A method is disclosed. The method includes the steps of generating one or more sets of state category component data by allocating component data signals corresponding to a plurality of parameters into respective one or more sets of state category component data, generating a plurality of first dynamic thresholds and a plurality of second dynamic thresholds corresponding to at least one of the one or more sets of state category component data based upon a respective state category component data in the one or more sets of state category component data and a respective parameter in the plurality of parameters, and determining an impending trip of a device utilizing the plurality of first dynamic thresholds and the plurality of second dynamic thresholds.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure provides detection of Inlet Guide Vane (IGV) system failures and component failures at incipient phase, identification of the root causes of the failures (diagnosis), and prediction of impending gas turbine trips. As further discussed below, the present disclosure further provides detection, identification and prediction of other types of failures, and causes of impending trips. Real time diagnostics, prognostics and a case logging platform that prognoses and provides suitable recommendations for impending trips in gas turbines arising from IGV system failures is provided. Prediction of impending trips allows an operator or a controller to gracefully shutdown a turbine, and therefore prevents useful life of the turbine and components in the turbine.

Figure 1:
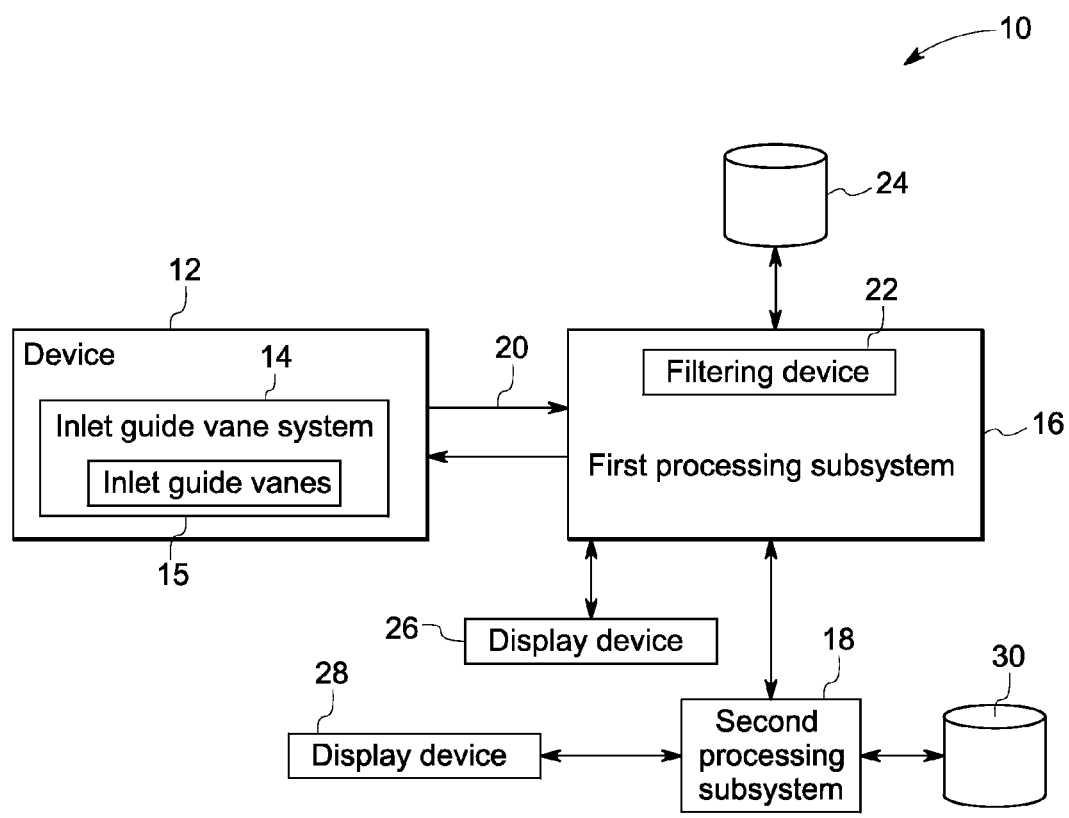
FIG. 1 illustrates an exemplary embodiment of a trip prediction system, in accordance with certain embodiments of the present systems.

FIG. 1 illustrates an exemplary embodiment of a trip prediction system 10, in accordance with certain embodiments of the present systems. In one embodiment, the system 10 predicts impending trips of a device 12 and time period left to trip. The system 10 predicts impending trips of the device 12 in real-time. The device 12, for example, may be a turbine, a land based gas turbine, an axial compressor, or the like. In certain embodiments, the system 10 determines component failures and component errors that may result in imminent trip of the gas turbine 12.

In one embodiment, when the device 12 is a gas turbine or an axial compressor, the device 12 includes an inlet guide vane system 14. The inlet guide vane system 14, for example, includes inlet guide vanes 15, servo valve actuator, hydraulic actuator, linear voltage differential transformers (LVDT), dump valve, and other components that are used for operating the inlet guide vanes 15, and receiving feedback signals for determining the position and state of the inlet guide vanes 15. When the device 12 is a gas turbine or an axial compressor, the system 10 may determine impending trips of the gas turbine 12 due to one or more component failures in the inlet guide vane system 14.

As shown in FIG. 1, the system 10 includes a first processing subsystem 16 and a second processing subsystem 18. The first processing subsystem 16, for example, may be located in vicinity to the device 12, whereas the second processing subsystem 18 may be located at a remote location with respect to the location of the device 12 and the first processing subsystem 16. The first processing subsystem 16 is operationally coupled with the device 12. As shown in FIG. 1, the first processing subsystem 16 receives component data signals 20 from the device 12. In one embodiment, the first processing subsystem 16 receives the component data signals 20 in real-time with respect to the time of generation of the component data signals 20. The component data signals 20, for example, may be generated by a plurality of sensing devices, an onsite monitoring device, or the like devices/components that are located in/on or near the device 12.

It is noted that the component data signals 20 represent values of a plurality of parameters of the device 12. The parameters, for example, include inlet guide vane (IGV) parameters and operational parameters. As used herein the term "IGV parameters" refers to parameters that are used to determine the operating condition, state, fault or error in the inlet guide vane system 14 or a component in the inlet guide vane system 14. The term "IGV parameters" also refers to feedback signals generated by one or more components in the inlet guide vane system 14. The IGV parameters, for example, include IGV control servo current (CAGV), VIGV Reference Angle (CSRGV), Position feedback IGV (CSGV), Inlet bleed heating (CSRBH), or the like. As used herein, the term "operational parameters" refers to parameters that are used to determine the operating condition of the device 12. The operational parameters, for example, include power generation in watts (DWATT), Compressor Inlet Flange Temperature (CTIM), Fuel Stroke Reference (FSR), Compressor Discharge Temperature (CTD), Compressor temperature-inlet flange (CTIF), Inlet heating control valve position (CSBHX), or the like.

In embodiment, the first processing subsystem 16 includes a filtering device 22 that filters the component data signals 20 to remove noise from the component data signals 20. Furthermore, the first processing subsystem 16 processes the component data signals 20 to determine an impending trip of the device 12. In one embodiment, the first processing subsystem 16 predicts the impending trip in real-time with respect to the time of generation or reception of the component data signals 20. Furthermore, the first processing subsystem 16 may further determine a time period left before the device 12 trips. The determination of the impending trip and time to trip is explained in detail with reference to FIG. 2. As shown in FIG. 1, the first processing subsystem 16 is coupled to a data repository 24 that may store data, such as, the component data signals 20 and any other intermediate data that is generated in the process of determination of the impending trip. Subsequent to the determination of the impending trip, the first processing subsystem 16 may generate an alarm. In one embodiment, the alarm, for example, may be displayed on a display device 26 that is operationally coupled to the first processing subsystem 16.

It is noted that a trip of the device 12 results in an unplanned and rapid shutdown of the device 12. Such unplanned and rapid shutdown damages the device 12 or components in the device 12. Therefore, determination of the impending trip enables an operator/technician or a controller, such as, the first and second processing subsystems 16, 18 to gracefully shutdown the device 12 in a planned manner. Accordingly such graceful shutdown prevents the device 12 and the components in the device 12 from damage, and therefore, helps in retaining the useful life of the device 12.

As shown in FIG. 1, the system 10 further includes the second processing subsystem 18 that is operationally coupled to the first processing subsystem 16. As previously noted, the second processing subsystem 18 may be located at a remote location with respect to the location of the first processing subsystem 16 and the device 12. The second processing subsystem 18 may access the first processing subsystem 16, the data repository 24 and the display device 26. Accordingly, the second processing subsystem 18 may access the processing of the component data signals 20, or any intermediate data stored in the data repository 24. Furthermore, the second processing subsystem 18 may access the screen of the display device 26 for viewing the content or interface that is being displayed on the display device 26.

It is noted that while FIG. 1 shows that the second processing subsystem 18 is operationally coupled to a single first processing subsystem 16, in certain embodiments, the second processing subsystem 18 may be coupled to multiple first processing subsystems that are operationally coupled to respective multiple devices, such as, the device 12. Accordingly, the second processing subsystem 18 may access multiple first processing subsystems for monitoring and accessing multiple devices, such as, the device 12. Furthermore, when the second processing subsystem 18 is operationally coupled to the multiple first processing subsystems that are operationally coupled to the multiple devices, and the second processing subsystem 18 is located at a remote location, the second processing subsystem 18 may determine impending trips in one or more of the multiple devices, such as, the device 12 from a remote location in real time. Accordingly, one or more impending trips in the devices and a respective time period left to trip may be observed or determined by the second processing subsystem 18 from a remote location. Furthermore, in certain embodiments, when the processing subsystem 16 determines the impending trips, the first processing subsystem 16 may raise a remote case log and report the impending trip and time to trip to the second processing subsystem 18. In this way, appropriate action may be taken, such as but not limited to, a graceful shutdown, and repairing the identified problem before a trip is initiated.

It is noted that while in the presently contemplated configuration, the first processing subsystem 16 receives the component data signals 20, and processes the component data signals 20 to predict the impending trips, in certain other embodiments, the second processing subsystem 18 may directly receive the component data signals 20 and process the component data signals 20 to predict the impending trips. Accordingly, in one embodiment, when the second processing subsystem 18 is located at a remote location and is operationally coupled to multiple devices, such as the device 12, the second processing subsystem 18 may predict impending trips of the devices from the remote location in real-time.

Furthermore, the second processing subsystem 18 is coupled to a display device 28 and a data repository 30. The data repository 30 may store the component data signals 20 and any other data or information received from the device 12 and the first processing subsystem 16. The data repository 30 may further store alarms generated to show prediction of impending trips. Furthermore, the display device 28 may show the component data 20, the content being displayed on the display device 26, intermediate and final results, or the process of determination of the impending trips.

Figure 2:
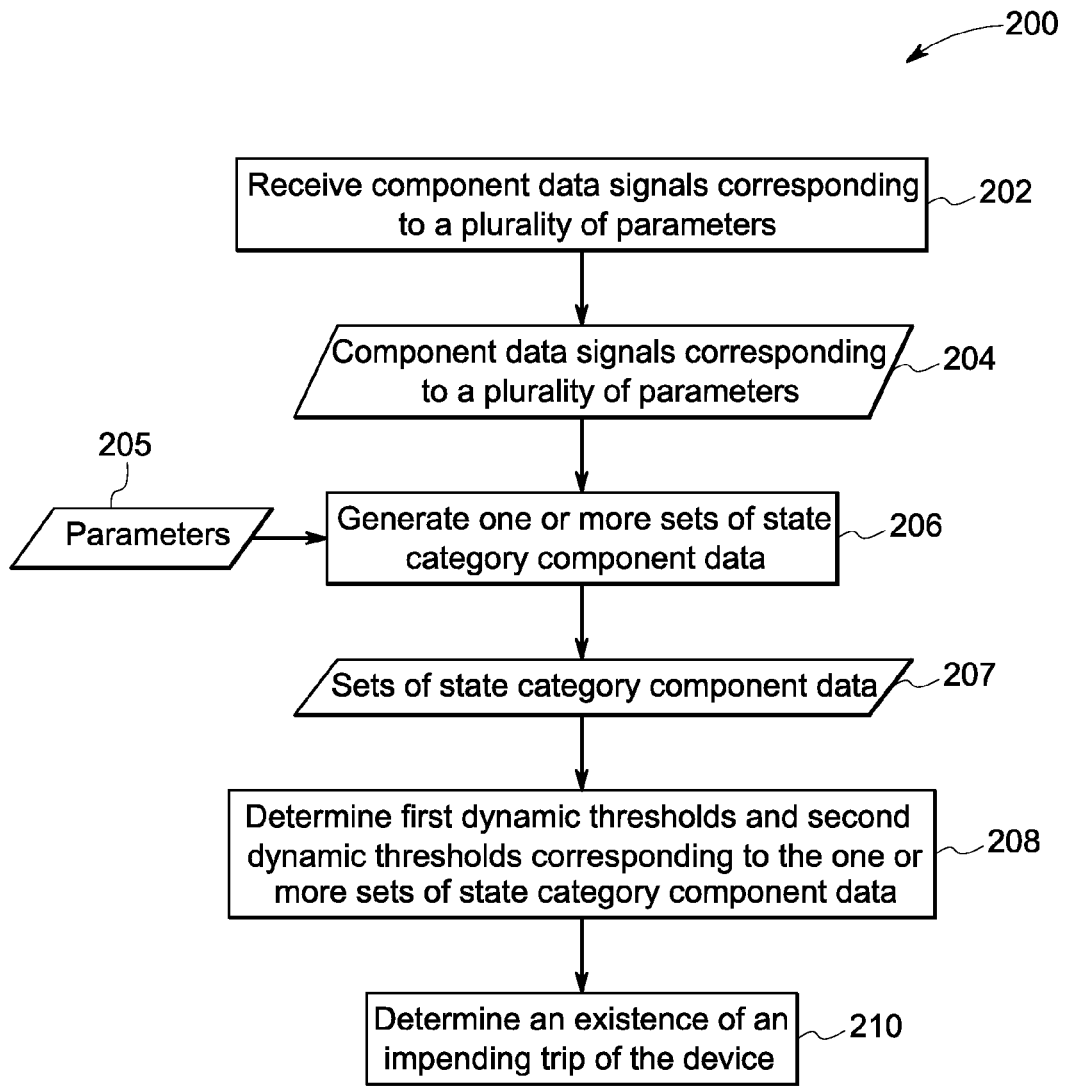
FIG. 2 is an exemplary flow diagram for determining impending trips of devices, in accordance with an embodiment of the present techniques.

FIG. 2 is an exemplary flow diagram 200 for determining impending trips of devices, in accordance with an embodiment of the present techniques. As previously noted, the impending trips may be determined by the first processing subsystem 16 or the second processing subsystem 18. Steps 202-210 in the flow diagram 200 may be carried out by the first processing subsystem 16 or the second processing subsystem 18. At step 202, component data signals 204 may be received. The component data signals 204, for example, may be the component data signals 20 (see FIG. 1). The component data signals 204 are values (for e.g. numeric values) of one or more of a plurality of parameters 205 corresponding to the device 12. As also previously noted in FIG. 1, the parameters 205, for example, may include IGV control servo current (CAGV), VIGV Reference Angle (CSRGV), Position feedback IGV (CSGV), Inlet bleed heating (CSRBH), Inlet heating control valve position (CSBHX), power generation in watts (DWATT), Compressor Inlet Flange Temperature (CTIM), Fuel Stroke Reference (FSR), Compressor Discharge Temperature (CTD), Compressor temperature-inlet flange (CTIF), or the like.

Figure 3:
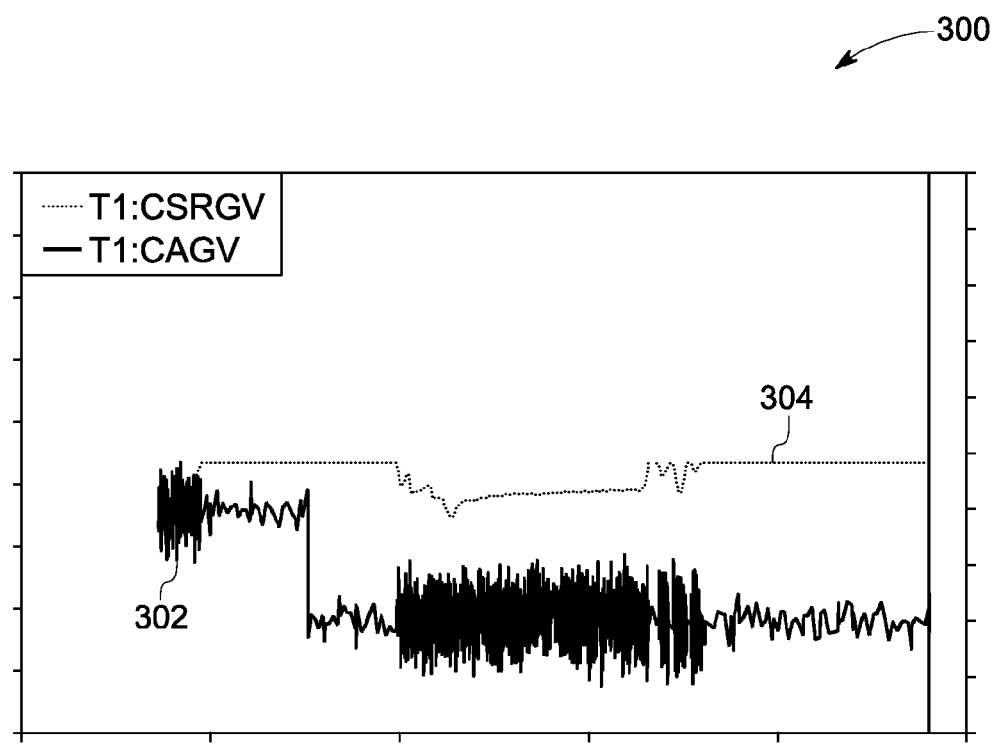
FIG. 3 shows experimental profiles of component data signals corresponding to two parameters, in accordance with certain aspects of the present techniques.

An exemplary graphical representation 300 that illustrates profiles of experimental component data signals 302, 304 is shown in FIG. 3. Particularly, FIG. 3 shows profiles of component data signals 302, 304 corresponding to two parameters. The two parameters are IGV control servo current (CAGV) and VIGV Reference Angle (CSRGV). Particularly, reference numeral 302 shows a component data signal corresponding to a parameter CAGV, and reference numeral 304 shows a component data signal corresponding to a parameter CSRGV.

With returning reference to FIG. 2, at step 206, one or more sets of state category component data 207 corresponding to the parameters 205 may be generated. In one embodiment, the sets of state category component data 207 corresponding to each of the parameters 205 may be generated. For example, in one embodiment, a plurality of sets of state category component data may be generated corresponding to the parameter CAGV, and a plurality of sets of state category component data may be generated corresponding to the parameter CSRGV. The sets of state category component data 207, for example, may include start-up category component data, transient category component data, load category component data, part load category component data, full load category component data, or the like. The sets of state category component data 207, for example, may be generated using the component data signals 204. The sets of state category component data 207, for example, may be generated based upon the state of the device 12 at the time of generation of the component data signals 20, 204. The generation of the sets of state category component data 207 is explained in detail with reference to FIG. 4.

Figure 4:
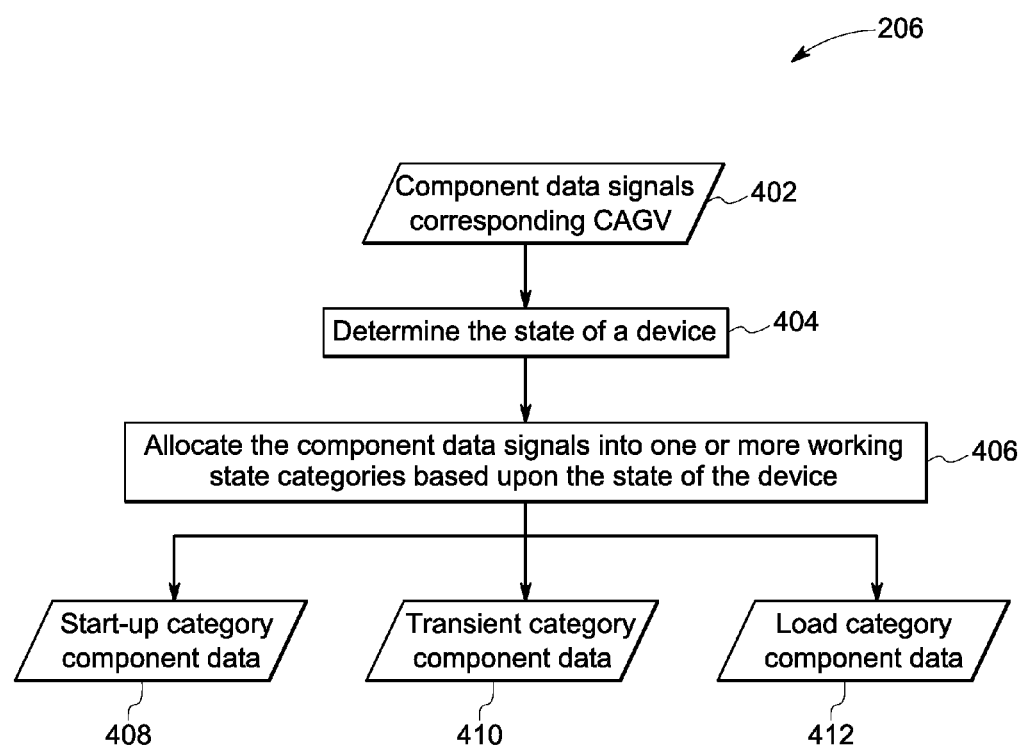
FIG. 4 is an exemplary flow diagram for generating one or more sets of state category component data, in accordance with an embodiment of the present techniques.

Turning now to FIG. 4, an exemplary flow diagram 206 for generating one or more sets of state category component data is shown, in accordance with an embodiment of the present techniques. In one embodiment, the sets of state category component data may be the sets of state category component data 207 (see FIG. 2). Particularly, FIG. 4 explains step 206 in FIG. 2 in greater detail. For ease of understanding, FIG. 4 shows determination of sets of state category component data 408, 410, 412 corresponding to a single parameter CAGV. However, it is noted that the method 206 may be used for generation of sets of state category component data corresponding to the parameters 205 including the IGV parameters and the operational parameters (referred to in FIG. 2).

Reference numeral 402 is representative of component data signals corresponding to a parameter: CAGV. It is noted that the component data signals 402 may be a subset or the whole of the component data signals 20, 204 (see FIG. 1, FIG. 2). At step 404, the state of the device 12 may be determined based upon an operational mode of the device 12 at the time of generation of the component data signals 402. For example, when the operational mode of the device 12 at the time of generation of the component data signals 402 is start-up mode, the state of the device 12 may be determined as start-up mode. In one embodiment, the state of the device 12, for example may be determined based upon the operational parameters in the parameters 205 referred to in FIG. 2. As previous noted with reference to FIG. 1, the operational parameters, for example, include power generation in watts (DWATT), Compressor Inlet Flange Temperature (CTIM), Fuel Stroke Reference (FSR), Compressor Discharge Temperature (CTD), Compressor temperature-inlet flange (CTIF), Inlet heating control valve position (CSBHX), or the like. For example, when CSBHX=ON/Off and CTIM=High/Low and there is no water wash in the device, and Dwatt<0 and THN>A and<=100, then the device 12 may be operating in a start-up mode. In certain embodiments, the device 12 may itself generate the state of the device 12 at the time of generation of the component data signals 402 corresponding to the parameter: CAGV. Accordingly, the device 12 may itself determine and generate respective state at the time of generation of the component data signals 20, 204, 402.

Furthermore, at step 406, the component data signals 402 corresponding to the CAGV may be allocated into one or more sets of state category component. In the presently contemplated configuration the component data signals 402 are allocated into the start-up category component data 408, the transient category component data 410, and the load category component data 412. The component data signals 402, for example, may be allocated into the sets of state category component data 408, 410, 412 based upon the state of the device 12 at the time of generation of the component data signals 402. For example, when a first portion of the component data signals 402 is generated during a time period when the device 12 was operating in a start-up mode, then the first portion of the component data signals 402 may be allocated to the start-up category component data 408. Similarly, when a second portion of the component data signals 402 is generated during a time period when the device 12 was operating in a transient mode, then the second portion of the component data signals 402 may be allocated to the transient category component data 410.

The sets of state category component data signals, for example, may include start-up category component data, transient category component data, load category component data, full load category component data, part load category component data, or the like. While the presently contemplated method 206, shows allocation of the component data signals 402 corresponding to CAGV into the three state category component data 408, 410, 412, the present method 206 may be used for generation of the state category component data corresponding to one or more of the parameters 205 (see FIG. 2) into multiple sets of state category component data.

Referring back to FIG. 2, at step 206, the one or more sets of state category component data 207 are generated. The sets of state category component data, for example, may include the sets of state category component data 408, 410, 412 (see FIG. 4). At step 208, a plurality of first dynamic thresholds and a plurality of second dynamic thresholds may be determined The first dynamic thresholds and the second dynamic thresholds, for example, may be determined corresponding to each of the state category component data 207 corresponding to one or more of the parameters 205. As used herein, the term "first dynamic threshold" may be used to refer to a value that is generated dynamically based upon respective state category component data and a respective parameter, and operates as a baseline for determination of features corresponding to a device. As used herein, the term "second dynamic threshold" may be used to refer to a value that is generated dynamically based upon a respective state category component data and a respective parameter, and is compared with the first dynamic threshold for determination of abnormalities in a device. For example, when a first dynamic threshold and a second dynamic threshold is determined corresponding to a state category component data: start-up category component data, wherein the start-up category component data corresponds to parameters: CSRGV and CSGV, then the first dynamic threshold may be determined using a difference of the parameters CSRGV and CSGV. The determination of the first dynamic threshold and the second dynamic threshold is explained in detail with reference to FIG. 5.

Figure 5:
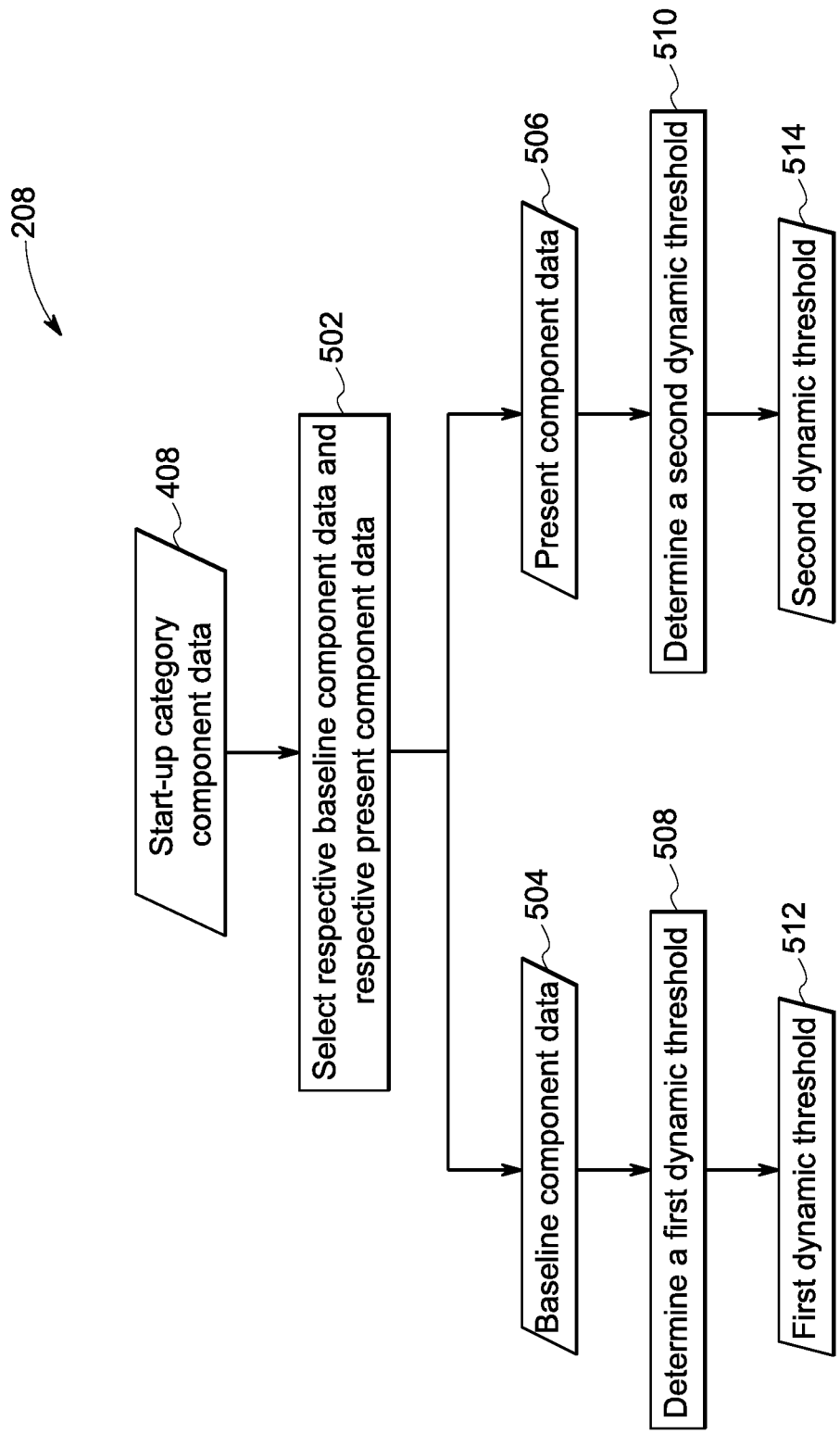
FIG. 5 is an exemplary flow diagram for determining a first dynamic threshold and a second dynamic threshold, in accordance with an embodiment of the present techniques.

Turning now to FIG. 5, an exemplary flow diagram 208 for determining a first dynamic threshold and a second dynamic threshold, in accordance with an embodiment of the present techniques, is shown. Particularly, FIG. 5 explains step 208 of FIG. 2 in accordance with one embodiment of the present techniques. As previously noted with reference to FIG. 4, reference numeral 408 is representative of the start-up category component data corresponding to the parameter: CAGV. For ease of convenience, FIG. 5 explains determination of a first dynamic threshold 512 and a second dynamic threshold 514 corresponding to the start-up category component data 408 corresponding to the parameter: CAGV. However, FIG. 5 may be used for determination of a first dynamic threshold and a second dynamic threshold corresponding to one or more of the sets of state category component data 207 corresponding to one or more of the parameters 205. For example, FIG. 5 may be used for determination of a first dynamic threshold and a second dynamic threshold corresponding to a transient category component data, a load category component data, a part load category component data, a full load category component data corresponding to one or more of the parameters 205 (see FIG. 2).

At step 502, baseline component data 504 and present component data 506 corresponding to the start-up category component data 408 may be selected from the start-up category component data 408. Since in the presently contemplated configuration, the first dynamic threshold 512 and the second dynamic threshold 514 are determined corresponding to the start-up category component data 408 corresponding to the parameter CAGV, the baseline component data 504 and the present component data 506 are selected from the start-up category component data 408 corresponding to the parameter CAGV. However, when a first dynamic threshold and a second dynamic threshold is determined corresponding to start-up category component data corresponding to a parameter CSRGV, baseline component data and present component data may be selected from start-up category component data corresponding to the parameter CSRGV.

As used herein, the term "baseline component data" refers to a portion selected from a respective state category component data and wherein the baseline component data is used for determination of a respective first dynamic threshold. For example, in the presently contemplated configuration, the baseline component data 504 is a portion of the start-up category component data 408. As used herein, the term "present component data" refers to a portion selected from a respective state category component data, and wherein the present component data is used for determination of a second dynamic threshold. In one embodiment, the portion of the state category component data 408 may include whole of the state category component data 408. The baseline component data 504 and the present component data 506, for example, may be data generated for a determined time period, data generated during the last determined time period, or between two specified time slots, or based upon any other requirement. For instance, in the presently contemplated configuration, the baseline component data 504 may be a portion of the start-up category component data 408 generated for 15 minutes 6 hours ago. Similarly, the present component data 506 may be a portion of the start-up category component data 408 generated during the last 15 minutes.

Furthermore, at step 508, the first dynamic threshold 512 is determined The first dynamic threshold 512 is determined using the baseline component data 504 and a first predetermined rule. The first predetermined rule, for example, may be selected based upon a respective parameter in the parameters 205 and a respective state category component data 207, 408, 410, 412 (see FIG. 2 and FIG. 4). The first predetermined rule, for example, may be as follows:

$$\text{First\_Dyn}(T) = \text{MD}(\text{Base\_data}) \pm \text{Rn}(\text{Base\_data}) \pm A \ast \text{STD}(\text{Base\_data}) \quad (1)$$

wherein First_Dyn(T) is first dynamic threshold, MD is median, Rn is range, A is a constant, STD is standard deviation, and Base_data is baseline component data. It is noted that the value of the constant A depends upon a parameter in the parameters 205 and a state category component data in the sets of sate category component data 207 corresponding to which a first threshold is determined. In a first scenario, a first threshold 512 is determined using start-up category component data corresponding to a parameter: CAGV. In a second scenario, a first dynamic threshold 512 is determined using start-up category component data corresponding to an error, i.e. a difference of parameters CSRGV and CSGV. It is noted that the value of A used for determination of the first threshold 512 in the first scenario may be different from the value of A used for determination of the first threshold 512 in the second scenario.

Furthermore, at step 510, the second dynamic threshold 514 is determined The second dynamic threshold 514 is determined using the present component data 506 and a second predetermined rule. Furthermore, the second predetermined rule, for example, may be selected based upon a respective parameter in the parameters 205 and a respective state category component data 207, 408, 410, 412 (see FIG. 2 and FIG. 4). In one embodiment, the second predetermined rule may be as follows:

$$Sec\_Dyn(T) = MD(Pres\_data) \pm Rn(Pres\_data) \pm B*STD(Pres\_data) \qquad (2)$$

wherein Sec_Dyn(T) is second dynamic threshold, MD is median, Rn is range, A is a constant, STD is standard deviation, and Pres_data is present component data. It is noted that the value of the constant B depends upon a parameter in the parameters 205 and a state category component data in the sets of sate category component data 207 corresponding to which a second threshold is determined. In a first scenario the second threshold 514 is determined using start-up category component data corresponding to a difference of parameters: CAGV. In a second scenario, a second threshold 514 is determined using start-up category component data corresponding to an error, i.e. a difference of parameters CSRGV and CSGV. It is noted that the value of B used for determination of the second dynamic threshold 514 in the first scenario may be different from the value of B used for determination of the second threshold 514 in the second scenario.

With returning reference to FIG. 2, at step 208, the first dynamic thresholds and the second dynamic thresholds are determined. The first dynamic thresholds, for example, include the first dynamic threshold 512, and the second dynamic thresholds, for example, may include the second dynamic threshold 514 (see FIG. 5). Subsequently at step 210, an existence of an impending trip of the device 12 is determined. The existence of the impending trip, for example is determined using the first dynamic thresholds and the second dynamic thresholds. When the existence of the impending trip of the device 12 is determined, a time period left before trip may be determined. The determination of the impending trip will be explained in detail with reference to FIG. 6.

Figure 6:
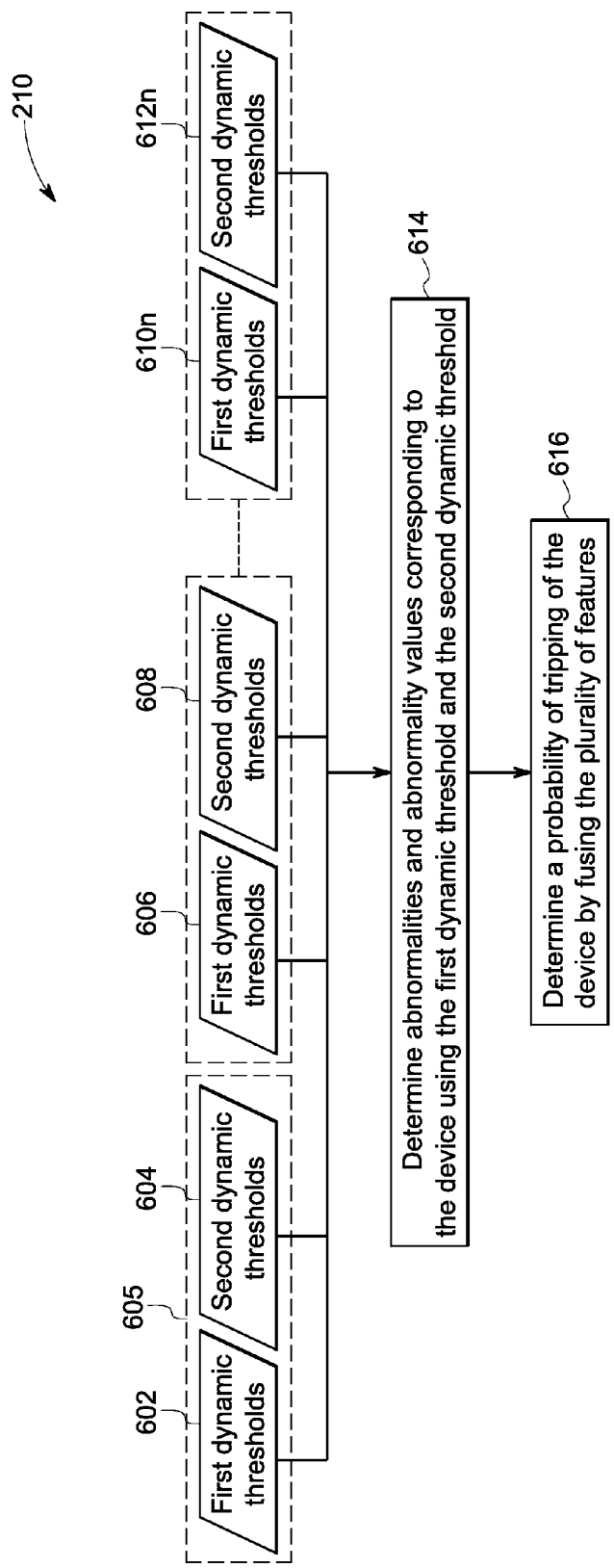
FIG. 6 is an exemplary flow diagram for determining a probability of an impending trip of the device, in accordance with an embodiment of the present techniques.

Turning now to FIG. 6, an exemplary flow diagram 210 for determining a probability of an impending trip of the device 12, in accordance with an embodiment of the present techniques, is shown. Reference numerals 602 and 604, reference numerals 606 and 608, and reference numerals 60(n) and 60(n+2) are representative of sets of first dynamic thresholds and second dynamic thresholds generated for a determined time period. It is noted that each of the sets of first dynamic thresholds and second dynamic thresholds correspond to a state category component data corresponding to a parameter. For example, the set 605 that includes the first dynamic thresholds 602 and the second dynamic thresholds 604 may correspond to a state category component data corresponding to a parameter CAGV.

Reference numeral 602 is representative of first dynamic thresholds (determined for a determined time period) corresponding to a state category component data in the one or more sets of state category component data 207 corresponding to a parameter in the parameters 205. Similarly, reference numeral 604 is representative of second dynamic thresholds (determined for a determined time period) corresponding to the state category component data in the one or more sets of state category component data 207 corresponding to a parameter in the parameters 205. The first dynamic thresholds 602, for example, may include the first dynamic threshold 512 (see FIG. 5). Similarly, the second dynamic threshold, for example, may include the second dynamic threshold 514 (see FIG. 5). Similarly reference numeral 606 is representative of first dynamic thresholds (generated for a determined time period) corresponding to another state category component data in the one or more sets of state category component data 207 corresponding to a parameter in the parameters 205. Again reference numeral 606 is representative of second dynamic thresholds (generated for a determined time period) corresponding to the another state category component data in the one or more sets of state category component data 207 corresponding to a parameter in the parameters 205. In the presently contemplated configuration, reference numeral 61(n) is representative of first dynamic thresholds corresponding to still another state category component data in the one or more sets of state category component data 207 corresponding to a parameter in the parameters 205. Again reference numeral 61(n+2) is representative of a second dynamic threshold corresponding to the nth state category component data in the one or more sets of state category component data 207 corresponding to a parameter in the parameters. It is noted that the number of sets of a first dynamic threshold and a second dynamic threshold depends upon the number of sets of state category component data and a number of parameters. In one embodiment, the sets of first dynamic thresholds and second dynamic thresholds may be equal to or less than the number of sets of state category component data. Therefore, in one embodiment, when there are three sets of state category component data corresponding to each of the three parameters, then the number of sets of first dynamic threshold may be 9 or less than 9.

Furthermore, at step 614, a plurality of abnormalities in the components of the device 12 or the inlet guide vane system 14 may be determined. The abnormalities, for example, may include difference from expected abnormality, variation abnormality, mean difference abnormality, growth rate of an abnormality, time period of existence of an abnormality, or the like. The abnormalities in the components of the device 12 or the inlet guide vane system 14, for example, may be determined using the sets of first dynamic threshold and second dynamic threshold 602, 604, 606, 608, 610n, 612n. Various examples to determine the abnormalities in the components are discussed below.

EXAMPLE 1

Difference from Expected Abnormality

Figure 7:
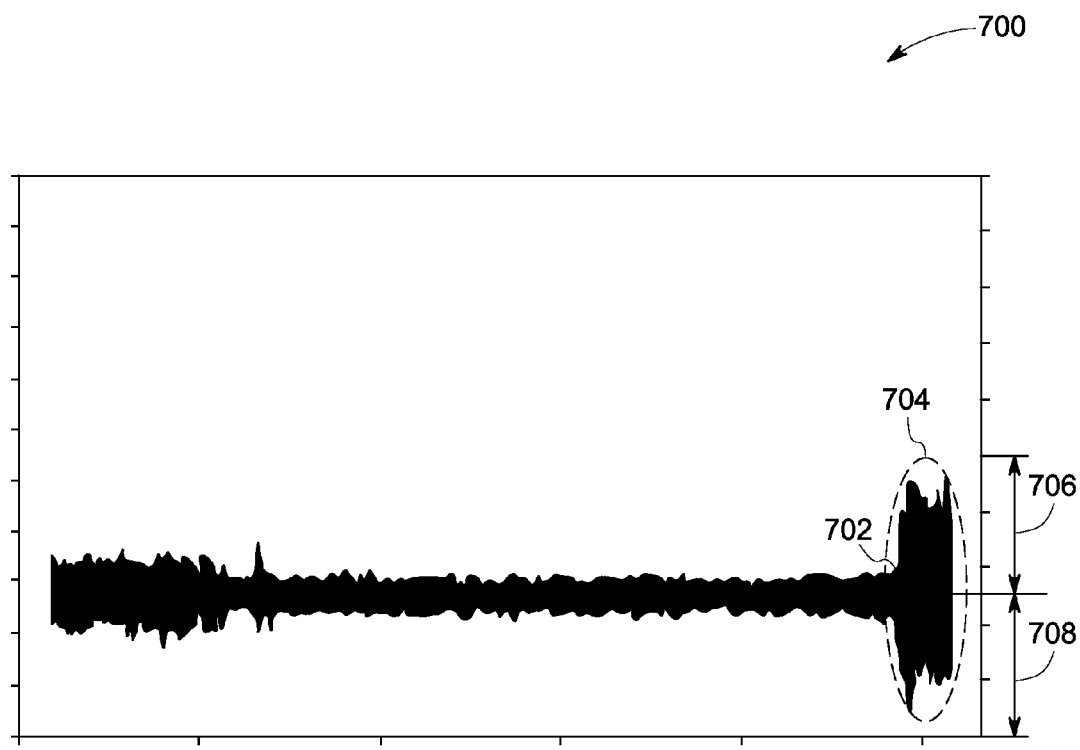
FIG. 7 shows an experimental profile of a state category component data corresponding to a parameter CAGV, in accordance with one aspect of the present techniques.

When the first dynamic thresholds 602 and the second dynamic thresholds 604 correspond to a state category component data corresponding to a parameter CAGV, then difference from expected abnormality may be determined by comparing the first dynamic thresholds 602 to the respective second dynamic thresholds 604. The difference from expected abnormality, for example, may be determined by comparing the first dynamic thresholds 602 to the second dynamic thresholds 604 to determine whether there is a positive shift, or a negative shift or both shifts being shown by the state category component data corresponding to the parameter CAGV. For example, when both the values of the thresholds 602, 604 are positive, and when the second dynamic thresholds 604 are subtracted from the respective first dynamic thresholds 602 to generate substantial negative values for a determined time period, then it may be deduced that there is a positive shift being shown by the state category component data corresponding to the parameter CAGV. Similarly, when the first dynamic threshold 602 is positive and the second dynamic threshold is negative, it may be deduced that there is a negative shift being shown by the state category component data corresponding to the parameter CAGV. An experimental profile of state category component data corresponding to a parameter CAGV is shown in FIG. 7. As shown by the profile 700, prior to a point 702 there is negligible shift being shown by the state category component data corresponding to the parameter CAGV. However, as shown by a dotted circle 704, after the point 702, a positive shift 706 and a negative shift 708 is shown by the state category component data corresponding to the parameter CAGV. Similar positive shift and negative shift in the state category component data corresponding to the parameters 205 may be determined or computed by analyzing and taking a difference of a respective first dynamic threshold and a respective second dynamic threshold corresponding to a parameter, not limited to but including the parameter CAGV. Such negative or positive shift may be representative of an IGV error/fault including but not limited to, a linear voltage differential transformers (LVDT) error/fault or a servo valve error/fault. Accordingly, when a shift (positive, negative or both) is determined in the set of category component data corresponding to a parameter, it may be representative of a fault or error in a component in the device 12 or the IGV system 14. In the presently contemplated configuration, when the shift is determined, a respective abnormality value may be determined by subtracting the second dynamic threshold 604 from the first dynamic threshold 602. Furthermore, in certain embodiments, it may be noted for how long (time period) and how fast the abnormality continues or grows.

EXAMPLE 2

Variation Abnormality and Mean Difference Abnormality

In one embodiment variation abnormality may be determined, when there is a shift shown by state category component data corresponding to a parameter. The variation abnormality is used to determine whether there is a variation shown by state category component data corresponding to a parameter CAGV. In one embodiment, the variation abnormality may be determined by using sets of state category component data corresponding to parameters CAGV, CSGV and CSRGV. For determination of variation abnormality corresponding to the parameter CAGV, first dynamic thresholds and second dynamic thresholds corresponding to the parameters CAGV and the difference of CSRGV and CSGV may be compared to the values of the CAGV or a difference of CSRGV and CSGV at a time instant. For example, if the first dynamic thresholds 606 and the second dynamic thresholds 608 correspond to a state category component data CSRGV, then existence of variation is declared when any one of the following conditions is satisfied.

First dynamic thresholds $(t)$<Are values of a difference of $CSRGV(t)$ and $CSGV(t)$>Second dynamic thresholds $(t)$ (3)

First dynamic thresholds $(t)$>Are values of a difference of $CSRGV(t)$ and $CSGV(t)$<Second dynamic thresholds $(t)$ (4)

When the abovementioned condition (3) is satisfied, it is declared that variation abnormality exists. It is noted that the abovementioned condition may be used to determine mean difference abnormality. The variation abnormality and mean difference abnormality may show errors/faults in filter clogging, servo error/failure, filter choking, or the like. Furthermore, when existence of variation abnormality is detected, variation abnormality values may be determined For example, the variation abnormality values may be determined by taking a mean and standard deviation of the first dynamic thresholds and second dynamic thresholds for a determined time period.

At step 616, the abnormality values determined at step 614 may be fused to determine the probability of tripping of the device 12. As previously noted, the abnormality values may include difference from expected value, abnormality exposure time, abnormality growth rate, spread of the abnormality, and the like. The abnormality values, for example, may be fused using Bayesian fusion. In one embodiment, the abnormality values may be fuse by assigning apriori weights/probabilities to each of the abnormality values before fusing the abnormality values. The apriori weights/probabilities, for example, may be assigned by a domain expert. The fusion of the abnormality values results in determination of probability of tripping of the device. Furthermore, based upon the probability of trip and the abnormality growth rate, and other abnormality values, the time left to trip may be determined While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a processing subsystem that receives component data signals corresponding to a plurality of parameters of a device, wherein the plurality of parameters of the device comprise at least inlet guide parameters including a VIGV Reference Angle (CSRGV) and a Position feedback IGV (CSGV), wherein the processing subsystem:
generates one or more sets of state category component data by allocating the component data signals into respective one or more sets of state category component data;
selects baseline component data and present component data from a respective set of state category component data in the one or more sets of state category component data;
determines a plurality of first dynamic thresholds based upon the baseline component data and a plurality of second dynamic thresholds based upon the present component data;
determines a variation abnormality by comparing a difference of the VIGV Reference Angle (CSRGV) and the Position feedback IGV (CSGV) to the plurality of first dynamic thresholds and the plurality of second dynamic thresholds;
determines abnormality information corresponding to the variation abnormality based on the plurality of first dynamic thresholds and the plurality of second dynamic thresholds;
determines an impending trip of the device based on the anomaly information; and
shuts down the gas turbine prior to the impending trip.

2. The system of claim 1, wherein the abnormality information comprises a plurality of corresponding abnormality values, wherein the processing subsystem is further programmed for:
fusing the plurality of corresponding abnormality values to determine a probability of tripping of the device; and
determining the impending trip of the device based upon the probability of tripping of the device.

3. The system of claim 2, wherein the plurality of corresponding abnormalities comprise a difference from expected abnormality, a variation abnormality, a mean difference abnormality, a mean shift abnormality, growth rate of an abnormality, a time period of existence of an abnormality, or combinations thereof.

4. The system of claim 1, wherein the plurality of parameters comprises: operational parameters in addition to the inlet guide vane parameters.

5. The system of claim 4, wherein the inlet guide vane parameters further comprise IGV control servo current (CAGV).

6. The system of claim 4, wherein the operational parameters comprise Power generation in watts (DWATT), Compressor Inlet Flange Temperature (CTIM), Fuel Stroke Reference (FSR), Compressor Discharge Temperature (CTD), Compressor temperature-inlet flange (CTIF), Inlet heating control valve position (CSBHX), Inlet bleed heating (CSRBH), or combinations thereof.

7. The system of claim 1, wherein the one or more sets of state category component data comprise a start-up category component data, a transient category component data, a load category component data, a part load category component data, a full load category component data, or combinations thereof.

8. The system of claim 1, wherein the device is a turbine, a land based gas turbine or an axial compressor.

9. The system of claim 1, further comprising a display device that shows one or more alarms indicating the impending trip of the device.

10. A method, comprising:
generating one or more sets of state category component data by allocating component data signals corresponding to a plurality of parameters of a device into respective one or more sets of state category component data, wherein the plurality of parameters of the device comprise at least inlet guide parameters including a VIGV Reference Angle (CSRGV) and a Position feedback IGV (CSGV);
selecting baseline component data and present component data from a respective set of state category component data in the one or more sets of state category component data;
determining a plurality of first dynamic thresholds based upon the baseline component data and a plurality of second dynamic thresholds based upon the present component data;
determining a variation abnormality by comparing a difference of the VIGV Reference Angle (CSRGV) and the Position feedback IGV (CSGV) to the plurality of first dynamic thresholds and the plurality of second dynamic thresholds;
determining abnormality information corresponding to the variation abnormality based on the plurality of first dynamic thresholds and the plurality of second dynamic thresholds;
determining an impending trip of the device based on the anomaly information; and
shutting down the gas turbine prior to the impending trip.

11. The method of claim 10, wherein generating the one or more sets of state category component data comprises:
determining a state of the device at the time of generation of the component data signals; and
allocating the component data signals into the respective one or more sets of state category component data based upon the state of the device.

12. The method of claim 10, further comprising generating the plurality of first dynamic thresholds and the plurality of second dynamic thresholds for a determined time period.

13. The method of claim 10, wherein determining the first dynamic threshold is further based upon a first predetermined rule; and
determining the second dynamic threshold is further based upon a second predetermined rule.

14. The method of claim 13, further comprising selecting the first predetermined rule and the second predetermined rule based upon respective parameter in the plurality of parameters and the respective state category component data in the one or more sets of state category component data.

15. The method of claim 10, wherein determining the abnormality information comprises determining a plurality of abnormality values based upon the plurality of first dynamic thresholds and the plurality of second dynamic thresholds; and
wherein determining the impeding trip comprises fusing the plurality of abnormality values to determine a probability of tripping of the device; and
determining the impending trip of the device based upon the probability of tripping of the device.

16. The method of claim 15, wherein fusing the plurality of abnormality values to determine a probability of tripping of the device comprises fusing the plurality of abnormality values using a Bayesian fusion and an apriori probability assigned to the plurality of abnormality values.

17. The method of claim 16, further comprising assigning an apriori probability to each of the plurality of abnormality values using domain knowledge.

18. The method of claim 16, wherein fusing the plurality of abnormality values further comprises normalizing one or more of the plurality of abnormality values generated due to varnishing and calibration issues.

* * * * *

UNITED STATES PATENT AND TRADEMARK OFFICE
CERTIFICATE OF CORRECTION

PATENT NO. : 9,122,991 B2  
APPLICATION NO. : 13/600387  
DATED : September 1, 2015  
INVENTOR(S) : Babu et al.

Page 1 of 1

It is certified that error appears in the above-identified patent and that said Letters Patent is hereby corrected as shown below:

On the Title Page, in Item (63), under "Related U.S. Application Data", in Column 1, Line 2, delete "Aug. 21, 2007," and insert -- Aug. 23, 2007, --, therefor.

IN THE SPECIFICATION

In Column 1, Line 13, delete "11/843,951," and insert -- 11/843,951, now Pat. No. 8,250,017, --, therefor.

In Column 7, Lines 17-18, delete "determined The" and insert -- determined. The --, therefor.

In Column 8, Line 36, delete "determined The" and insert -- determined. The --, therefor.

In Column 8, Line 63, delete "determined The" and insert -- determined. The --, therefor.

In Column 11, Line 63, delete "determined For" and insert -- determined. For --, therefor.

IN THE CLAIMS

In Column 12, Line 52, in Claim 1, delete "anomaly" and insert -- abnormality --, therefor.

In Column 14, Line 2, in Claim 10, delete "anomaly" and insert -- abnormality --, therefor.

In Column 14, Line 32, in Claim 15, delete "impeding" and insert -- impending --, therefor.

Signed and Sealed this  
Twelfth Day of January, 2016

Michelle K. Lee  
*Director of the United States Patent and Trademark Office*